(No Model.)

W. F. MATTES & J. F. LEWIS.
GREASE CUP.

No. 407,226. Patented July 16, 1889.

WITNESSES

INVENTORS
William F. Mattes
John F. Lewis
By R. S. & A. P. Lacey
Attorneys

UNITED STATES PATENT OFFICE.

WILLIAM F. MATTES AND JOHN F. LEWIS, OF SCRANTON, PENNSYLVANIA, ASSIGNORS TO WM. F. MATTES, TRUSTEE, OF SAME PLACE.

GREASE-CUP.

SPECIFICATION forming part of Letters Patent No. 407,226, dated July 16, 1889.

Application filed October 10, 1888. Serial No. 287,742. (No model.)

*To all whom it may concern:*

Be it known that we, WILLIAM F. MATTES and JOHN F. LEWIS, citizens of the United States, residing at Scranton, in the county of Lackawanna and State of Pennsylvania, have invented certain new and useful Improvements in Grease-Cups; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to grease-cups or lubricators, and is chiefly designed as an improvement on our invention for which Letters Patent of the United States were obtained October 30, 1888, No. 392,161.

The object of the present invention is to inclose the working parts and protect them from accidental damage, whereby the cup is available for use on road-engines and locomotives. A further object is to reduce the total height of the device.

The improvement consists in the novel construction and combination of the parts, which will be hereinafter more fully described and claimed, and shown in the annexed drawings, in which—

Figure 1:
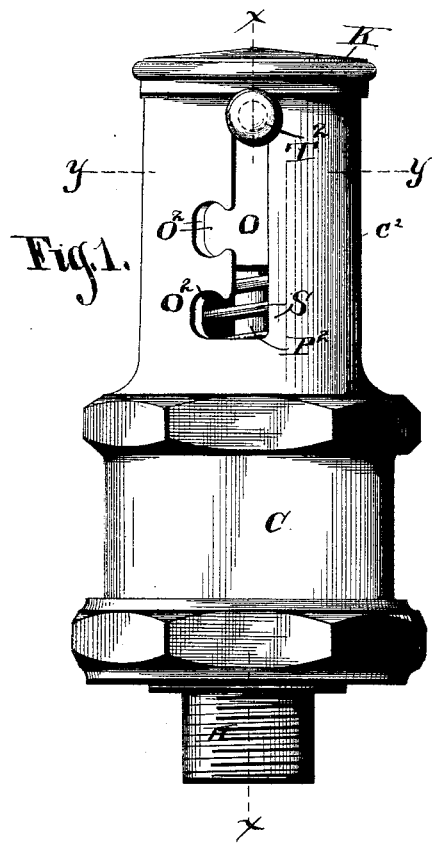
Figure 2:
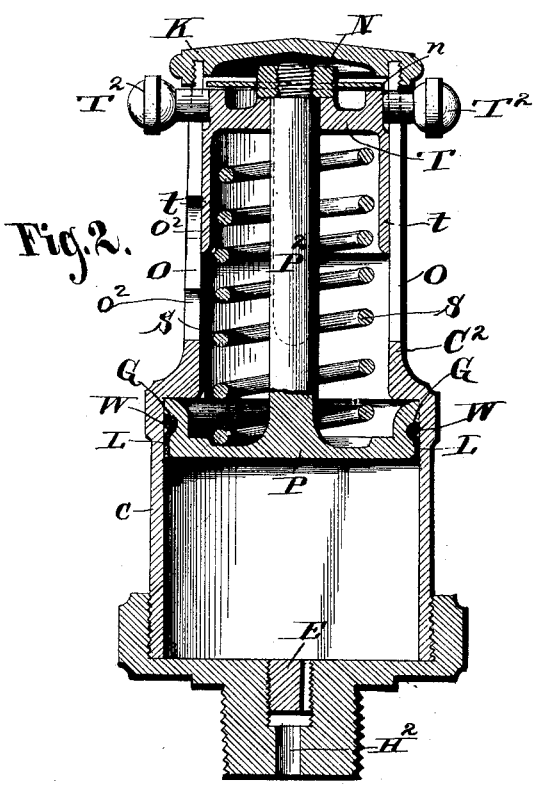
Figure 3:
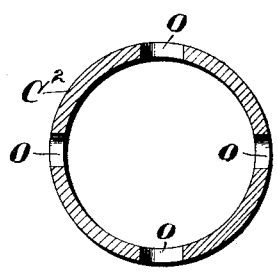

Figure 1 is a side view of our invention; Fig. 2, a vertical central section on the line X X of Fig. 1; Fig. 3, a cross-section of the cylindrical projection of the cup, and Fig. 4 a bottom plan view of the piston.

C is the body of the cup and receptacle for the lubricant.

H is a shank by which the cup is secured to the part to be lubricated. H² is a hole in the shank through which the lubricant is expelled.

P is a piston having attached to it the piston-rod P², the latter passing through the cross-head T. The cup C is extended upward and forms the cylindrical projection C², within which the cross-head T slides. This cylindrical projection has slots O in the sides, and the cross-head T has arms T², which project through the slots O. The sides of the slots have notches O² large enough to receive and hold the arms T². These notches are arranged in pairs, as rights and lefts, on opposite sides of the cylindrical projection C². The end of the piston-rod P² projecting above the cross-head T has fastened to it a nut or collar N, which has a projecting disk $n$ nearly equal in diameter to the interior of the cylindrical projection C². The rim $t$ depends from the cross-head T and fits the interior of the cylindrical projection C² snugly. The upper end of the cylindrical projection C² is covered by a cap K above the parts described. The spring S is interposed between the cross-head T and the piston P, and its upper end fits within the rim $t$.

When the receptacle C has been filled with grease, the operator presses downward upon the arms T², which slide in the slots O, and fastens the arms down by hooking them into the notches O². This movement brings the pressure of the spring to bear upon the piston, with the effect of slowly pressing it downward and expelling the grease through the hole H². While the movement is progressing the space between the collar N and the cross-head T is an indication of the amount of grease remaining to be expelled before the operation will be suspended by the contact of these parts, and the enlargement of the collar N brings it into view through the slots O, enabling the operator at all times to observe its position. To further assist him in this observation, additional slots may be cut through the cylindrical projection C². The cap K serves the double purpose of protecting the working parts from dust and injury and of strengthening the upper part of the cylindrical projection C².

Figure 4:
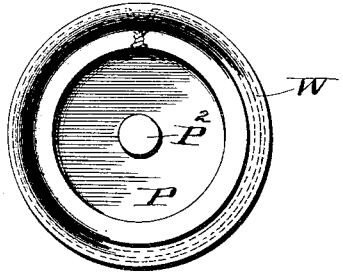

A further improvement has been made in the manner in which the piston P is packed. A ribbon of packing L is interposed between the piston and the sides of the cup C. This ribbon is held in position by being pressed into a groove G in the piston by means of the wire W. The ends of the wire are conveniently secured by being turned in through the hole in the piston and then twisted together, as shown in Fig. 4.

Having thus described our invention, what we claim, and desire to secure by Letters Patent, is—

1. The combination, with the cup provided with a slot in the side of the upper part thereof and having a notch extending from the side of the slot, and the piston working in the cup, of the cross-head arranged to slide within the upper part of the cup, a spring interposed between the cross-head and the piston, and an arm projecting from the cross-head and extending through the said slot in the upper part of the cup, substantially as and for the purpose described.

2. The combination, with the cup having slots in the upper part thereof, and the piston, of the cross-head having arms that extend through said slots, and the spring placed between the piston and the cross-head, substantially as and for the purpose described.

3. The combination, with the cup having slots in the upper part thereof, the armed cross-head, the piston, and the piston-rod passing through the said cross-head, of a projecting collar secured to the piston-rod above the cross-head, substantially as and for the purpose described.

4. The combination, with the cup having slots in the upper part thereof, the armed cross-head, the piston, and the spring, of the cap K, for strengthening the upper part of the cup and protecting the operating parts, substantially as set forth.

5. The combination, with the cup having a feed-hole in the bottom, of the piston having the groove G, packing L, and wire W.

6. The combination, with the cup having the cylindrical projection $C^2$, provided with slots O and with notches $O^2$, of the piston having the rod $P^2$, the cross-head having the depending rim $t$, the arms $T^2$, and the spring interposed between the cross-head and the piston, having its upper end fitting in the rim $t$, substantially as described.

In testimony whereof we affix our signatures in presence of two witnesses.

WILLIAM F. MATTES.
JOHN F. LEWIS.

Witnesses:
 C. L. KIRKPATRICK,
 W. L. JONES.